Dec. 19, 1939.     I. HINSHAW     2,184,188
SPRING SUSPENSION FOR VEHICLES
Filed Aug. 31, 1938     2 Sheets—Sheet 1
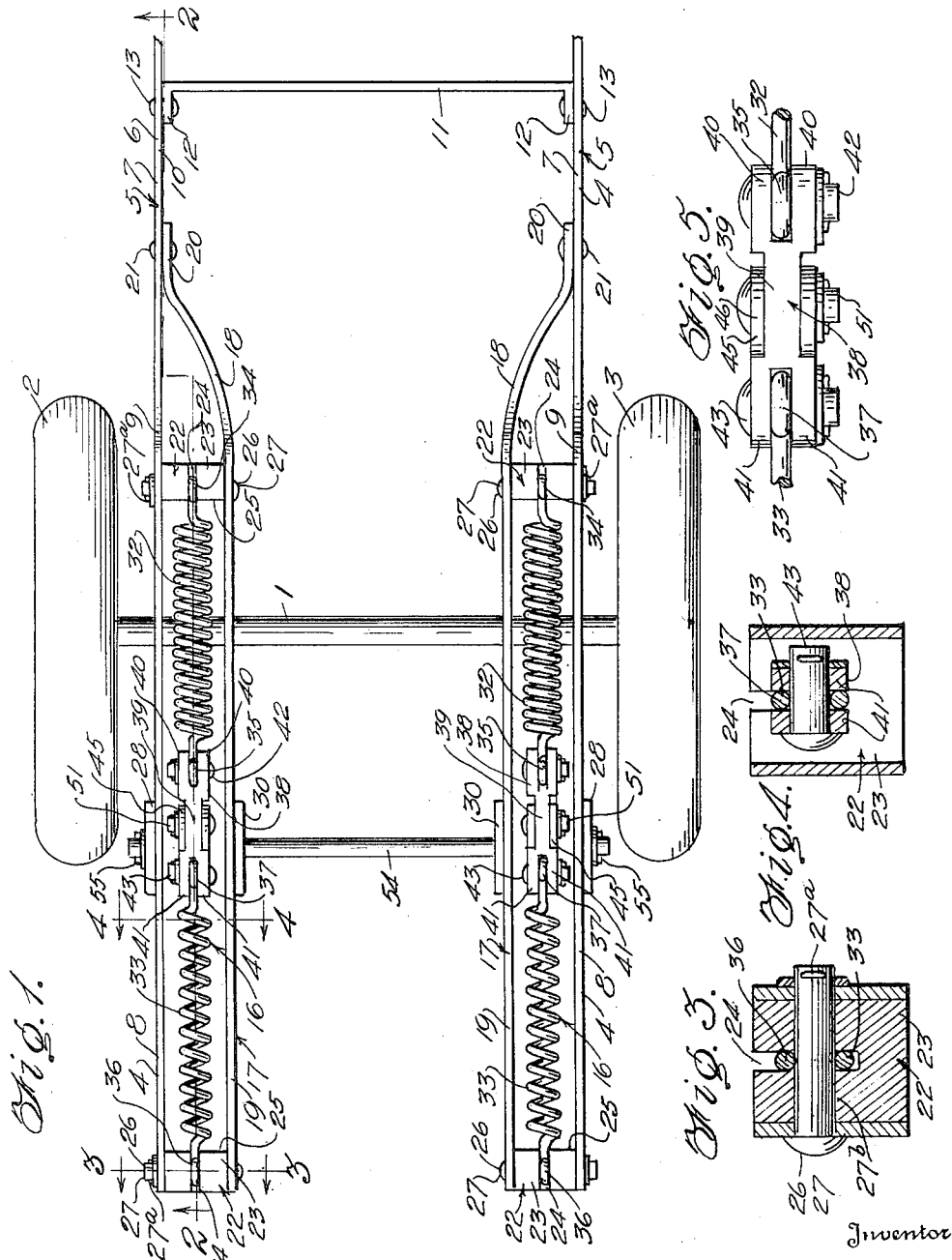
Inventor
IRA HINSHAW,
By Kimmel & Crowell,
Attorneys

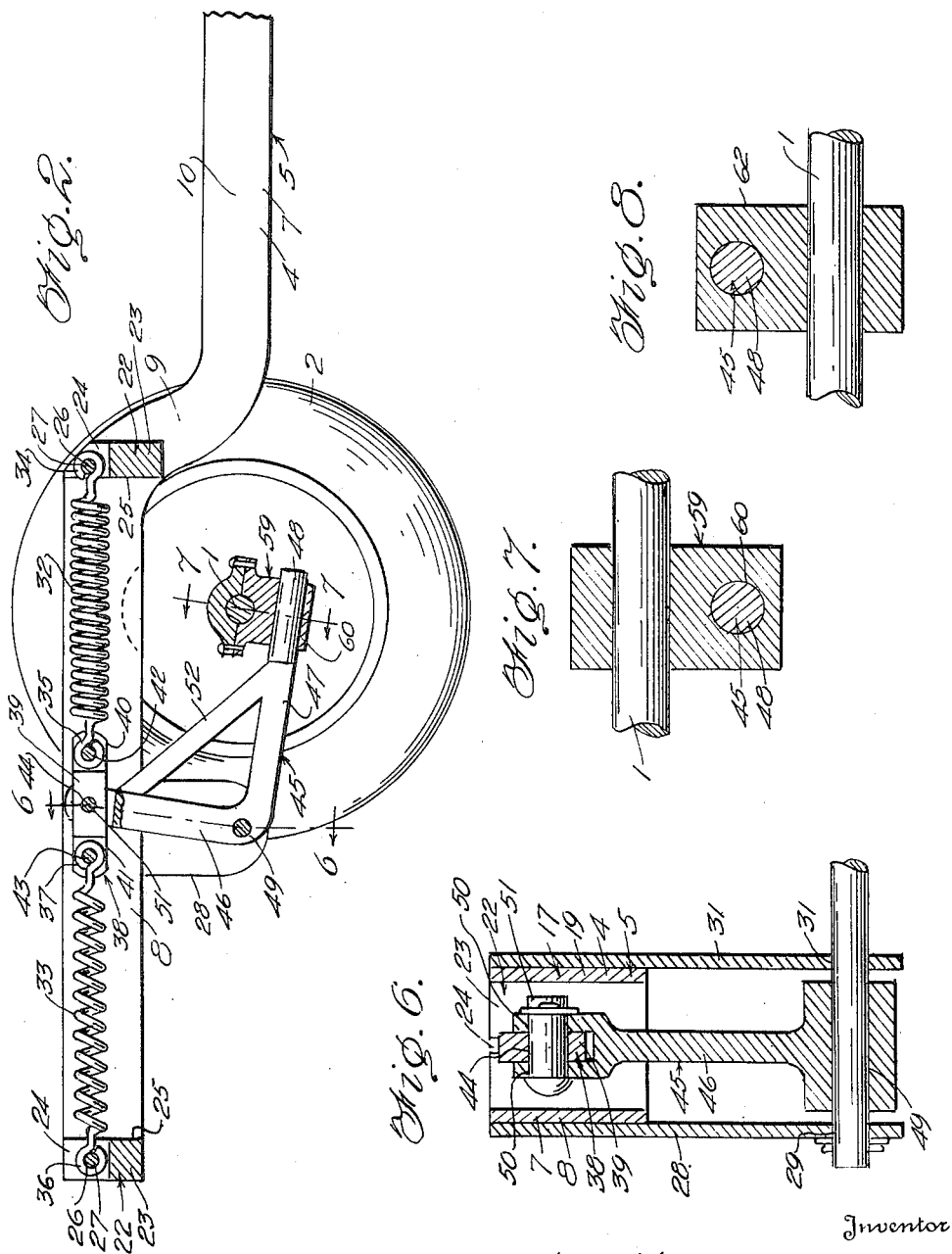

Patented Dec. 19, 1939

2,184,188

UNITED STATES PATENT OFFICE 2,184,188

SPRING SUSPENSION FOR VEHICLES

Ira Hinshaw, Topeka, Kans.

Application August 31, 1938, Serial No. 227,810

3 Claims. (Cl. 267—20)

This invention relates to a spring suspension designed primarily for use in connection with automobiles, but it is to be understood that a suspension, in accordance with this invention is for employment in connection with any form of trucks, busses or railroad passenger coaches for which it may be found applicable.

The invention aims to provide, in a manner as hereinafter set forth, a spring suspension for the front or rear wheels of an automobile and other vehicles acting to cushion the latter and to assist in holding the vehicle balanced while travelling.

The invention further aims to provide, a spring suspension for vehicle wheels acting to eliminate the oscillating of the frame of the vehicle, as well as the jolting of the frame which occurs when travelling over elevated and depressed portions of a road surface.

The invention further aims to provide a spring suspension for the purpose set forth so constructed and arranged relative to the axle, frame and a pair of wheels of the vehicle to form the vehicle with a six way flexible action, thus the position of one wheel does not affect the other and each absorbs the shock independently.

The invention further aims to provide, a spring suspension for the wheels of a vehicle including a pair of connected together springs for each wheel attached parallel to the frame of the vehicle in tandemwise relation; one spring acting as a load spring and the other spring as shock spring; the load spring being considerably stronger than the shock spring and carries the weight of the vehicle; as the weight is increased the load spring stretches and the shock spring is compressed whereby the strength of the latter is increased by reason of the decreased tension; the load springs act as a cushion for the vehicle; and the function of the shock spring is not only to arrest the recoil of the load spring but to also assist in holding the vehicle in balance.

The invention further aims to provide a suspension for the purpose referred to including load and shock springs and with the springs so arranged and connected to allow them to follow natural reaction to tension, regardless as to how far they are forced to stretch.

As is well known, automobiles now carry the weight on the springs, rather than suspended from springs. The natural action observed in vehicles carried on springs is that when their wheels contact an unusually hard bump, the springs are crushed. When they return to their natural position they have a tendency to throw the weight of the car upward. It is a further aim of this invention to overcome the objection aforesaid by preventing this upward throw by the arrangement of the shock spring, the latter eliminating the need of a shock absorber and which accomplishes the same function of the shock absorber, but in a more efficient manner.

The invention further aims to provide a spring suspension for the purpose referred to which is strong, durable, compact, simple in its construction and arrangement, thoroughly efficient in its use, readily assembled and installed with respect to the axle, frame and a pair of wheels of the vehicle, quickly repaired when occasion requires and comparatively inexpensive to manufacture.

Embodying the foregoing aims and to others which may hereinafter directly or indirectly appear, the invention consists of the novel construction, combination and arrangement of parts to be referred to and illustrated in the accompanying drawings, wherein is shown an embodiment of the invention installed with respect to the rear wheels, axle and frame of an automobile, but it is to be understood that changes, variations and modifications may be resorted to which fall within the scope of the invention as claimed.

In the drawings:

Figure 1 is a top plan-view of a spring suspension, in accordance with the invention, showing the adaptation thereof, by way of example with respect to the rear wheels and the rear portion of the frame or chassis of an automobile, Figure 2 is a section on the line 2—2 of Figure 1, Figures 3 and 4 are respectively sections on lines 3—3 and 4—4, Figure 1, Figure 5 is a fragmentary view in top plan illustrating the connection between a load spring and a shock spring, Figures 6 and 7 are respectively sections on lines 6—6 and 7—7, Figure 2, and Figure 8 is a sectional detail illustrating a modified form of swinging support for an arm of the controlling levers.

The spring suspension is illustrated by way of example with the rear axle 1, rear wheels 2, 3 and rear portion 4 of the frame or chassis 5 of an automobile. The portion 4 is elevated with respect to the part 6 of the chassis 5.

Each of the side bars 7 (Figure 2) of the frame 5, as shown, includes a high rear part 8, a downwardly extending forwardly directed inclined or curved part 9 and a low part 10. The part 8 merges at its forward end into the upper end of part 9. The latter at its lower end merges into the rear end of the part 10. The parts 10 of the bars 7 are connected together by a cross brace 11 having angularly disposed end terminal portions 12 secured, against the inner faces of the parts 10 by the holdfast means 13 of any suitable form.

The suspension is formed of two like sections, each section being arranged to oppose the inner side surface of the part 9 of a frame bar 7. Each section of a suspension extends forwardly and rearwardly with respect to the axle 1, as well as being slidably connected to the latter. Each section of the suspension is generally indicated at 16 and it includes a supporting member 17 disposed on its lower lengthwise edge and formed of a leading part 18 and a trailing part 19. The part 18 as shown curves outwardly and downwardly with respect to the forward end of part 19 and is formed with a flange 20 at its forward end which bears against and is secured to the inner face of the part 10 of the bar 7. The part 19 is straight throughout and of greater length than the part 18. The latter provides for the disposing of part 19 of member 17 in parallel spaced relation with respect to the inner surface of the part 8 of that bar 7 to which part 18 is secured. The rear end of part 8 is flush with the rear end of the part 19. The latter and the part 8 may or may not have their bottom surfaces cut out to form clearances for the axle 1. The cutout would conform to the dotted line showing Figure 2.

The part 19 is maintained in spaced relation with respect to the part 8 by a pair of oppositely disposed spaced aligned combined spacing and anchoring elements 22 of like form arranged between said parts 8, 19. Each element consists of a block 23 formed centrally thereof with a vertically disposed groove 24 opening at the top and sides of the block. The inner side faces 25 of the blocks align. One of the elements 22 is arranged between the rear ends and flush with the rear surfaces of the parts 8, 19. The other of the elements 22 is arranged between the part 19 in proximity to its point of mergence with the part 18 and the forward end of the part 9 of a bar 7. The pair of elements 22 are detachably secured to the parts 8, 9 of a bar 7 and part 19 of a member 17 by holdfast means 26 in the form of threaded headed bolts 27 having slotted ends carrying cotter pins 27ª. The holdfast means 26 constitute anchors for a purpose to be referred to and extend through openings 27ᵇ formed in the blocks 23 in proximity to the bottoms of and intersect the grooves 24. The member 17, elements 22 and the holdfast means 26 provide what may be termed a combined supporting and anchoring structure.

Welded or otherwise secured to the outer side surface of the part 8 of each bar 7, intermediate its ends is a depending hanger 28 formed with an opening 29 in proximity to its lower end. Welded or otherwise secured to the outer side surface of the part 19 of each member 17 intermediate its ends is a depending hangar 30 formed with an opening 31 in proximity to its lower end. The hangers 28 align. The hangers 30 align. The hangers 28 align with the hangers 30. The openings 29 align. The openings 31 align. The openings 29 align with the openings 31.

Each section of the suspension includes a coiled leading spring 32 and a coiled trailing spring 33 disposed in tandemwise spaced relation. The spring 32 is termed a load spring and the spring 33 a shock spring. The springs are disposed in parallel spaced relation to the inner side surface of the part 8 of a bar 7 and the part 19 of a supporting member 17. The load spring 32 is considerably stronger than the shock spring 33. The forward end 34 of spring 32 is angularly disposed with respect to the coils of the latter, is of loop-like form, extends into the groove of the forward element 22 and is connected to the latter by one of the holdfast means 26 extending therethrough. The rear end 35 of the spring 32 is also of loop-like form, is disposed relative to the coils of the spring 32 at an angle and aligns with the end 34. The ends 34, 35 of spring 32 are intersected centrally by the axis of the coiled body of said spring. The holdfast means 26 for the forward element 22 constitutes an anchor for the forward end 34 of spring 32. The rear end 35 of spring 32 will be more fully referred to. The rear end 36 of spring 33 is angularly disposed with respect to the coils of the latter, is of loop-like form, extends into the groove of the rear element 22, is connected to the latter by the other holdfast means 26 extending therethrough, and is attached to said rear element. The forward end 37 of the spring 33 is also of loop-like form, is disposed relative to the coils of spring 33 at an angle and aligns with the end 36. The ends 36, 37 of spring 33 are intersected centrally by the axis of the coiled body of such spring. The forward end 37 of spring 33 will be more fully referred to.

The springs 32, 33 are connected together in tandemwise relation by a pair of sidewise aligned, oppositely disposed, spaced, suspended, bodily shiftable links 38 of like form and each consists of a horizontal intermediate part 39 and a pair of apertured end parts 40, 41. The rear end 35 of spring 32 is arranged between the parts 40 and is connected to the latter by a holdfast means 42 of a form similar to the means 26. The forward end 37 of the spring 33 is arranged between the end parts 41 and is connected to the latter by a holdfast means 43 of the same form of the holdfast means 42. The holdfast means 42, 43 extend through the spring ends 35, 37. The intermediate part 39 of a link is of less thickness than the end parts of the latter and is formed centrally thereof with an opening 44. The end parts of a link are offset with respect to the inner face of the intermediate part of the link. The link part 39 is of greater length than link parts 40, 41.

The links 38 are pivotally suspended by a controlling lever 45. The latter normally is disposed at a rearward inclination with respect to the links and is substantially of bell crank form. The lever 45 includes a rear upstanding arm 46 and a forwardly directed horizontally disposed lower arm 47 which has its rear end merging into the lower end of arm 46. The arm 47 is of greater length than arm 46 and has a rounded forward end terminal portion 48. In proximity to the point of mergence of the arms 46, 47, the lever 45 is formed with an opening 49. The upper end of arm 46 is arranged about the intermediate parts 39 of the links 38 and is formed with an opening 50 which aligns with the openings 44 in the links. The lever 45 is coupled with the links 48, for the purpose of pivotally suspending them by a pivot structure 51 of a form corresponding to holdfast device 26. The lever 45 is provided with an inclined brace bar 52 which has its ends integral with the arms 46, 47.

There is associated with the controlling levers 45 of the suspension a support and which also constitutes a common fulcrum therefor. The support is in the form of a bar 54 extending through the openings 29 in the hangers 28, the openings 31 in the hangers 30 and the openings 49 in the levers 45. The bar 54 also connects the sections of a suspension together. The bar 54 is connected to the hangers 28 by the removable retaining means 55.

There is associated with the end terminal portion 48 of the arm 47 of each controlling lever a swinging or oscillatory support 59 therefor and which is loosely mounted on the axle, as well as depends from the latter. The support 59 is what may be termed a cap bearing. The support 59 consists of a rectangular block formed of an upper and a lower section, detachably connected together and having their opposed faces provided with oppositely extending registering semi-circular grooves to provide for the mounting of the block on the axle housing. The lower section of the block is of greater length than the upper section and in proximity to its lower end is formed with a passage 60 extending from its rear side to its forward side. The terminal portion 48 of the arm is slidably extended through the passage 60. The support 59 slidably suspends the arm 47 from the axle.

With reference to Figure 8 a modified form of swinging support 62 for the arm 47 of the controlling levers is shown. The support 62 is of the same construction as the support 59 with the exception that it is reversed and positions the arm 47 above the axle than below the latter as is provided by the support 59.

As is shown and described the inner ends of the springs of each pair of springs are directly anchored to opposite ends of the linkage, and the outer ends of the springs of each pair of springs are anchored to a pair of spaced blocks which are secured against the inner side face of a terminal portion. By this arrangement the alternate compression and extension of the springs of a pair, on the shift of the linkage is had from the inner ends of the springs.

The load springs are considerably stronger than the shock springs and carry the weight of the vehicle and its passengers. As the weight is increased the load springs stretch and the shock springs are compressed. The mechanical effect of this is to increase the strength of the load springs by reason of the decreased tension. The load spring acts as a cushion for the vehicle very much as the spring used to hang a bird cage. The function of the shock springs is to arrest the recoil of the load springs when the wheels pass over an uneven surface. They also assist in holding the balance of the vehicle.

The links to which the lever and springs of a section are fastened allow the springs to follow the natural reaction to tension, regardless as to how far they are forced to stretch. There are no rigid connections and each and every position of the lever, links and springs is a natural flexible one. This insures long trouble-free operation and eliminates squeaks entirely so far as the springs are concerned. The fulcrum on which the lever is mounted actually takes the road shocks instead of the true axle. Since the bar 54 is mounted to the rear of the wheels, the seats may be carried more evenly between the front and rear points of shock. By using this type of spring suspension an almost perfect balance can be obtained.

What I claim is:

1. A spring suspension for vehicles comprising in combination with corresponding end portions of the sides of the frame of a vehicle, a pair of spaced oscillatory supports adapted to be connected with an axle of the vehicle, two pairs of springs, the springs of each pair being horizontally disposed, arranged tandemwise and positioned adjacent to the inner face of one of said end portions, one of the springs of each pair of springs constituting a load spring and the other a shock spring, a pair of spaced parallel combined supporting and anchoring structures positioned between the said corresponding end portions, each of said structures including a horizontal part opposing the inner face of one of the said end portions and a pair of spaced aligned grooved blocks bearing against said part and the inner face of the said end portion for receiving the outer ends of the springs of a pair, each structure including spaced holdfast means extending through its blocks and the said outer ends of the springs for securing the structure to the inner side face of one of the said end portions and for anchoring the said outer ends of the springs to the blocks, a linkage arranged between and anchored to the inner ends of each pair of springs for connecting the springs of such pair together, a controlling lever connected at one end to and depending from each linkage, each lever being slidably mounted at its outer end in a support, a fulcrum bar for extending through and common to said levers, and spaced hangers for said bar depending from said corresponding end portions and said structures.

2. A spring suspension for vehicles comprising in combination with corresponding end portions of the sides of the frame of a vehicle, a pair of spaced oscillatory supports adapted to be connected with an axle of the vehicle, two pairs of springs, the springs of each pair being horizontally disposed, arranged tandemwise in spaced relation and positioned adjacent to the inner side face of one of said end portions, one of the springs of each pair of springs constituting a load spring and the other a shock spring, a pair of spaced parallel combined supporting and anchoring structures for the said pairs of springs, said structures being positioned between the said corresponding end portions and each including a horizontal part opposing the inner face of one of said end portions and spaced means connecting the structure to one of said end portions and for supporting and anchoring the outer ends of the springs of one of said pair, a linkage arranged between and anchored to the inner ends of the springs of each pair of springs for connecting the springs of the pair together, a pair of controlling levers each pivotally connected at one end to and depending from each linkage and being slidably mounted at its outer end in a support, a fulcrum bar common to and extending through said levers intermediate their ends, and spaced hangers for said bar depending from said corresponding end portions and said horizontal parts of said structures.

3. In a spring suspension for vehicles comprising in combination with an end portion of one of the sides of the frame of a vehicle, an oscillatory support adapted to be connected with an axle of the vehicle, a pair of horizontally disposed springs arranged in tandemwise spaced relation and positioned adjacent to the inner side face of said end portion, one of said springs constituting a load spring and the other a shock spring, a combined supporting and anchoring structure for said spring arranged adjacent to the inner face of said end portion and including a horizontal part opposing the said inner face and a pair of spaced aligned means interposed between said part and said end portion for connecting said part to the frame and for anchoring the outer ends of the springs of said pair, a linkage arranged between and anchored to the inner ends of said springs for connecting said springs together, a controlling lever including an upstanding rear arm and a forwardly directed lower arm, said rear arm being pivotally connected at its upper end to said linkage and said lower arm slidably extending through said oscillatory support, a fulcrum bar for said lever extending through the lower end of said rear arm, and spaced hangers for said bar depending from said end portion and the horizontal part of said structure.

IRA HINSHAW.